United States Patent
Hsu et al.

(10) Patent No.: US 10,815,329 B2
(45) Date of Patent: Oct. 27, 2020

(54) PLASTICIZED THERMOSET RESIN, AND ASSOCIATED CURED RESIN, METHOD OF CURING, AND ARTICLE COMPRISING CURED RESIN

(71) Applicant: The University of Massachusetts, Boston, MA (US)

(72) Inventors: Shaw Ling Hsu, Amherst, MA (US); Jigneshkumar P. Patel, Amherst, MA (US)

(73) Assignee: The University of Massachusetts, Boston, MA (US)

(*) Notice: Subject to any disclaimer, the term of this patent is extended or adjusted under 35 U.S.C. 154(b) by 11 days.

(21) Appl. No.: 16/315,966

(22) PCT Filed: Jul. 7, 2017

(86) PCT No.: PCT/IB2017/054129
§ 371 (c)(1),
(2) Date: Jan. 7, 2019

(87) PCT Pub. No.: WO2018/008001
PCT Pub. Date: Jan. 11, 2018

(65) Prior Publication Data
US 2019/0338066 A1    Nov. 7, 2019

Related U.S. Application Data

(60) Provisional application No. 62/359,916, filed on Jul. 8, 2016.

(51) Int. Cl.
| | | |
|---|---|---|
| *C08G 8/10* | (2006.01) | |
| *C08J 3/24* | (2006.01) | |
| *C08K 5/07* | (2006.01) | |
| *C08K 5/101* | (2006.01) | |
| *C08K 5/132* | (2006.01) | |

(52) U.S. Cl.
CPC ............. *C08G 8/10* (2013.01); *C08J 3/244* (2013.01); *C08K 5/07* (2013.01); *C08K 5/101* (2013.01); *C08K 5/132* (2013.01)

(58) Field of Classification Search
CPC .. C08G 8/10; C08J 3/244; C08K 5/132; C08K 5/07; C08K 5/101
USPC ........................................................ 524/287
See application file for complete search history.

(56) References Cited

U.S. PATENT DOCUMENTS

| | | | |
|---|---|---|---|
| 2,201,321 A | 5/1940 | Robie et al. | |
| 2,665,261 A * | 1/1954 | Baker | ......................... C08J 5/06 523/207 |
| 2,825,638 A | 3/1958 | Booth | |
| 3,524,286 A | 8/1970 | Wohrer | |
| 3,891,408 A | 6/1975 | Rowse et al. | |
| 3,893,826 A | 7/1975 | Quinan et al. | |
| 3,904,559 A | 9/1975 | Furness et al. | |
| 4,426,484 A | 1/1984 | Saeki et al. | |
| 4,682,988 A | 7/1987 | Narayanan et al. | |
| 5,032,642 A | 7/1991 | Lemon et al. | |
| 5,051,454 A | 9/1991 | Lemon et al. | |
| 5,340,888 A | 8/1994 | Lemon et al. | |
| 5,413,685 A * | 5/1995 | Ozawa | ................. G01N 27/333 204/416 |
| 2013/0338288 A1 | 12/2013 | Arnaud | |
| 2015/0299471 A1 * | 10/2015 | Farnum | ................. C09D 5/002 524/186 |

FOREIGN PATENT DOCUMENTS

| | | |
|---|---|---|
| CN | 103183921 A | 7/2013 |
| EP | 1497075 | 1/2005 |
| JP | 4973446 | 7/1974 |
| JP | 11106647 | 4/1999 |
| TW | 2024696 B | 3/1993 |
| WO | 2002060985 A1 | 8/2002 |
| WO | WO02060985 * | 8/2002 |
| WO | 2014078947 A1 | 5/2014 |
| WO | 2015167758 A1 | 11/2015 |
| WO | 2016049479 A1 | 3/2016 |
| WO | 2018008003 A1 | 1/2018 |

OTHER PUBLICATIONS

Patel et al., Journal of Polymer Science, Part B: Polymer Physics, 53, 1519-1526, 2015. (Year: 2015).*
Allen et al., "Internal Rotation: The Infrared and Raman Spectra of Furfural"; Canadian Journal of Chemistry, vol. 33; 1955; pp. 1055-1061.
Baekeland; "On Soluble, Fusible, Resinous Condensation Products of Phenols and Formaldehyde"; Journal of Industrial and Engineering Chemistry—US, vol. 1; 1909; pp. 545-549.
Baekeland; "The Synthesis, Constitution, and Uses of Bakelite"; Journal of Industrial and Engineering Chemistry—US, vol. 1; 1909; pp. 149-161.
Cairns et al.; "Hydrogen Bonding in Phenols"; Nature, vol. 196, No. 4854; Nov. 1962; pp. 535-537.
Dargaville et al., "Chemistry of Novolac Resins. II. Reaction of Model Phenols with Hexamethylenetetramine"; Journal of Polymer Science Part A: Polymer Chemistry; 1997; vol. 35, pp. 1389-1398.
Enns et al., "Time-Tempurature-Transformation (TTT) Cure Diagram: Modeling the Cure Behavior of Thermostats"; Journal of Applied Polymer Science; 1983; vol. 28; pp. 2567-2501.
Feger et al., "Properties of Partially Cured Networks. 2. The Glass Transition", Macromolecules, 1985, vol. 18, pp. 280-284.

(Continued)

*Primary Examiner* — Hui H Chin
(74) *Attorney, Agent, or Firm* — Cantor Colburn LLP

(57) ABSTRACT

A curable composition includes a hydrogen-bonded prepolymer, a plasticizer that includes an alkyl benzoate or an alkyl phenyl ketone, and, optionally, a crosslinking agent. The plasticizer promotes a high extent of crosslinking and provides a more positive health and safety profile than the incumbent plasticizer, furfural. A cured resin and a method of forming it are described.

22 Claims, 5 Drawing Sheets

(56) References Cited

OTHER PUBLICATIONS

Gutowsky et al., "Proton Magnetic Resonance Studies on Natural Rubber. II. Line Shape and T1 Measurements"; The Journal of Chemical Physics; 1957, vol. 27, pp. 534-542.

Harvey et al.; "Further Studies on Phenolic Hexamethylenetetramine Compounds"; Journal of Industrial and Engineering Chemistry—US, vol. 13; 1921; pp. 135-141.

Hatfield et al., "Solid-State NMR Study of the Hexamethylenetetramine Curing of Phenolic Resins"; Macromolecules, vol. 20; 1987; pp. 608-615.

Holmes et al., "Group Additivity Values for Estimating the Enthalpy of Formation of Organic Compounds: An Update and Reappraisal. 1. C, H, and O"; The Journal of Physical Chemistry A, 2011, vol. 115, pp. 10576-10586.

Holmes et al., "Group Additivity Values for Estimating the Enthalpy of Formation of Organic Compounds: An Update and Reappraisal. 2. C, H, N, O, S, and Halogens"; The Journal of Physical Chemistry A, 2012, vol. 116, pp. 7196-7209.

International Search Report for International Application No. PCT/IB2017/054129; International Filing Date: Jul. 7, 2017; dated Dec. 26, 2017; 6 pages.

Katovic et al., "Intermolecular Hydrogen Bonding in Novolaks"; Industrial & Engineering Chemistry Product Research and Development, 1985, vol. 24, pp. 179-185.

Mangion et al., "Relaxations in Thermosets. 7. Dielectric Effects During the Curing and Postcuring of Epoxide by Mixed Amines"; Macromolecules, vol. 53, No. 15; 1990; pp. 3687-3695.

Monk et al., "Computational and Experimental Study of Phenolic Resins:Thermal—Mechanical Properties and the Role of Hydrogen Bonding"; Macromolecules; 2015, vol. 48, pp. 7670-7680.

Patel et al., "An Analysis of the Role of Reactive Plasticizers in the Crosslinking Reactions of a Rigid Resin"; Polymer, vol. 107; 2016; pp. 12-18.

Patel et al., "Characterization of the crosslinking reactions in high performance adhesives"; International Journal of Adhesion and Adhesives, vol. 78, 2017, pp. 256-262.

Patel et al.; "An Analysis of the Role of Nonreactive Plasticizers in the Crosslinking Reactions of a Rigid Resin"; Journal of Polymer Science Part B: Polymer Physics, vol. 55; 2017; pp. 206-213.

Patel et al.; "Path to Achieving Molecular Dispersion in a Dense Reactive Mixture"; Journal of Polymer Science Part B: Polymer Physics, vol. 53; 2015; pp. 1519-1526.

Patel et al.; "Reduction of Volatile Organic Compounds in Reactive Formulations Used in Bonded Abrasives"; Polymer Science & Engineering; Univ. of Mass. (Amherst); Jan. 2016; pp. 1-17.

Patel, Jigneshkumar, "Analyses of Densely Crosslinked Phenolic Systems Using Low Field NMR" (2017). Doctoral Dissertations. 1116. https://scholarworks.umass.edu/dissertations_2/1116, 205 pages.

Rosenfeld et al., "Solvent Control of the Soft Angular Potential in Hydroxyl-π Hydrogen Bonds: Inertial Orientational Dynamics"; The Journal of Physical Chemistry B, vol. 113; 2009; pp. 13300-13307.

Sprung; "A Summary of the Reactions of Aldehydes With Amines"; Chemical Reviews, 1940, vol. 26, 297-338.

V. R. Landi et al., "The Glass Transition in Novolac Phenolic Molding Compounds and the Kinetics of Its Development During Cure and Postcure. I"; Advances in Polymer Technology; 1987; vol. 7; pp. 49-57.

V. R. Landi et al., "The Glass Transition in Novolac Phenolic Molding Compounds and the Kinetics of Its Development During Cure and Postcure. II"; Advances in Polymer Technology; 1987; vol. 7; pp. 209-218.

Written Opinion for International Application No. PCT/IB2017/054129; International Filing Date: Jul. 7, 2017; dated Dec. 26, 2017; 11 pages.

Zhang et al. "The chemistry of novolac resins:3.13C and l5N n.m.r, studies of curing with hexamethylenetetramine"; Polymer; 1997; vol. 38, pp. 5835-5848.

Zhang et al., "The chemistry of novolac resins—V. Reactions of benzoxazine intermediates"; Polymer; 1998, vol. 39, pp. 399-404.

Zhang et al., "The chemistry of novolac resins—VI. Reactions between benzoxazine intermediates and model phenols"; Polymer; 1998, vol. 39, pp. 405-412.

\* cited by examiner

PLASTICIZED THERMOSET RESIN, AND ASSOCIATED CURED RESIN, METHOD OF CURING, AND ARTICLE COMPRISING CURED RESIN

CROSS REFERENCE TO RELATED APPLICATIONS

This application is a National Stage application of PCT/IB2017/054129, filed Jul. 7, 2017, which claims the benefit of U.S. Application No. 62/359,916, filed Jul. 8, 2016, both of which are incorporated by reference in their entirety herein.

BACKGROUND

For many thermoset systems, in order to produce a cured product with the desired mechanical properties, it is necessary to induce reactions of the thermoset with itself or the thermoset with a curing or crosslinking agent. Reaction kinetics and reaction products of multi-component systems are difficult to predict when the reaction mixture is not homogeneous (that is, when it includes at least two phases). For example, reactants can differ in molecular weight, inter-molecular interactions within and between reactants, and inter-molecular interactions between reactants and solvents or plasticizers.

One category of such systems involves the reaction of a hydrogen-bonded thermoset resin with itself, particularly when the resin is solid or viscous under the reaction conditions. Another category of such systems involves the reaction of a hydrogen-bonded thermoset resin and a crosslinking agent with low solubility in the resin. For example, a thermoset system can include a phenol-formaldehyde resin and a hexamethylenetetramine (HMTA; CAS Registry Number 100-97-0) crosslinking agent. Although this combination was first introduced in the late 1920s, the extreme rigidity of its cured product has hindered a detailed analysis of the crosslinking reaction. H. Baekeland, *J. Ind. Eng. Chem.-US*, 1909, vol. 1, pp. 149-161; L. H. Baekeland, *J. Ind. Eng. Chem.-US*, 1909, vol. 1, pp. 545-549; M. Harvey, L. H. Baekeland, *J. Ind. Eng. Chem.-US*, 1921, vol. 13, pp. 135-141. Even before crosslinking, the phenol-formaldehyde resin exhibits extensive intra- and inter-molecular hydrogen bonding. The crosslinking agent HMTA is highly crystalline (>99% crystallinity) and has a high melting temperature of nearly 280° C. A. Knop and L. Pilato, "Phenolic resins: chemistry, applications, and performance: future directions", Springer-Verlag: Berlin; New York, 1985; A. Knop and W. Scheib, "Chemistry and Application of Phenolic Resins", Berlin; Springer-Verlag, 1983; Z. Katovic, M. Stefanic, *Ind. & Eng. Chem. Prod. Res. Dev.*, 1985, vol. 24, pp 179-185; X. Q. Zhang et al., *Polym.*, 1997, vol. 38, pp. 5835-5848; J. P. Patel et al., *J. Polym. Sci. Part B: Polym. Phys.*, 2015, vol. 53, pp. 1519-1526. In order to induce a crosslinking reaction between the dissimilar phenol-formaldehyde resin and HMTA, a plasticizer, such as furfural, is typically used. Furfural has been shown to disrupt the hydrogen bonds of the resin, providing mobility to the resin, which in turn facilitates dissolution and dispersion of the crosslinking agent. J. P. Patel, et al., *J. Polym. Sci. Part B: Polym. Phys.*, 2015, vol. 53, pp. 1519-1526. Due to the rigidity of the phenyl ring of the phenol-formaldehyde resin, the glass transition temperature of the reaction product can rise quickly during the crosslinking reaction, rapidly creating a vitrified structure. V. R. Landi, J. M. Mersereau, *Adv. Polym. Tech.*, 1987, vol. 7, pp. 49-57; V. R. Landi, *Adv. Polym. Tech.*, 1987, vol. 7, pp. 209-218. When the vitrification point is approached, curing kinetics become diffusion controlled and strongly dependent on the local viscosity. J. B. Enns, J. K. Gillham, *J. App. Polym. Sci.*, 1983, vol. 28, pp. 2567-2501; C. Feger, W. J. MacKnight, *Macromol.*, 1985, vol. 18, pp. 280-284; M. B. M. Mangion, G. P. Johan, *Macromol.*, 1990, vol. 23, pp. 3687-3695. The plasticizer can decrease the local viscosity and increase the extent of crosslinking, which is important to increase in cohesive strength.

As previously noted, one plasticizer commonly used with phenol-formaldehyde resin and HMTA is furfural, as described, for example in U.S. Pat. No. 4,682,988 (Jul. 28, 1987) and U.S. Pat. No. 2,201,321 (May 21, 1940). Notwithstanding many decades of use, furfural's mechanism of action has only recently begun to come into focus. Mechanistic studies suggest that furfural can disrupt various inter-molecular interactions including hydrogen bonding in the phenol-formaldehyde resin. Although the freed hydroxyl groups of the phenol-formaldehyde resin do not appear to participate directly in the crosslinking reaction, they may interact through hydrogen bonding to help dissolve the HMTA, thereby facilitating the crosslinking reaction. The solubility of HMTA in furfural is extremely low at less than two percent by weight, so furfural is not expected to dissolve HMTA directly. J. P. Patel, et al., *J. Polym. Sci. Part B: Polym. Phys.*, 2015, vol. 53, pp. 1519-1526.

Although furfural is an effective plasticizer for curing hydrogen-bonded prepolymers such as phenol-formaldehyde resin, there is a desire for plasticizers that enable a higher extent of crosslinking, or a higher extent of polymerization, or both. It would be a further advantage if the plasticizer could offer improved health and safety characteristics.

BRIEF SUMMARY

One embodiment is a curable composition, comprising: a hydrogen-bonded prepolymer; a plasticizer comprising a $C_{1-12}$-alkyl benzoate, a $C_{1-12}$-alkyl phenyl ketone, a $C_{1-12}$-alkyl phenylacetaldehyde, a $C_{1-12}$-alkyl benzaldehyde, or a combination thereof, preferably wherein the plasticizer comprises a $C_{1-12}$-alkyl benzoate, a $C_{1-12}$-alkyl phenyl ketone, or a combination thereof.

Another embodiment is a method of forming a cured resin, comprising: reacting a hydrogen-bonded prepolymer, and, optionally, a crosslinking agent, in the presence of a plasticizer comprising a $C_{1-12}$-alkyl benzoate, a $C_{1-12}$-alkyl phenyl ketone, a $C_{1-12}$-alkyl phenylacetaldehyde, a $C_{1-12}$-alkyl benzaldehyde, or a combination thereof, preferably wherein the plasticizer comprises a $C_{1-12}$-alkyl benzoate, a $C_{1-12}$-alkyl phenyl ketone, or a combination thereof.

Another embodiment is a cured resin obtained by the method, and an article comprising the cure resin.

Another embodiment is a crosslinked composition, comprising: a hexamethylenetetramine-crosslinked phenol-formaldehyde resin; and a plasticizer comprising a $C_{1-12}$-alkyl benzoate, a $C_{1-12}$-alkyl phenyl ketone, a $C_{1-12}$-alkyl phenylacetaldehyde, a $C_{1-12}$-alkyl benzaldehyde, or a combination thereof, preferably wherein the plasticizer comprises a $C_{1-12}$-alkyl benzoate, a $C_{1-12}$-alkyl phenyl ketone, or a combination thereof.

Other embodiments include articles comprising the crosslinked composition.

These and other embodiments are described in detail below.

DETAILED DESCRIPTION

Figure 1:
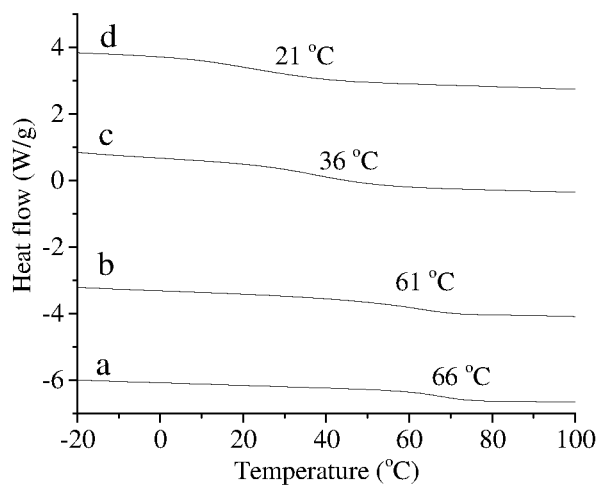
FIG. 1 is a plot of differential scanning calorimetry (DSC) data and observation of $T_g$ depression obtained for the phenol-formaldehyde prepolymer with different amounts of methyl benzoate (MB); (a) pure prepolymer (b) 0.04 mole fraction MB in prepolymer (c) 0.08 mole fraction MB in prepolymer (d) 0.12 mole fraction MB based on the total of MB and prepolymer. For clarity, the traces are offset.

The present inventors have determined that $C_{1-12}$-alkyl benzoates, $C_{1-12}$-alkyl phenyl ketones, or a combination thereof are effective plasticizers for the reaction of a hydrogen-bonded prepolymer with itself and, optionally, a crosslinking agent. The present plasticizer promotes a greater extent of crosslinking than does furfural, and, unlike furfural, the plasticizer does not appear to react directly with either the hydrogen-bonded prepolymer or the low-solubility crosslinking agent.

In an embodiment, a curable composition comprises: a hydrogen-bonded prepolymer; a plasticizer comprising a $C_{1-12}$-alkyl benzoate, a $C_{1-12}$-alkyl phenyl ketone, a $C_{1-12}$-alkyl phenylacetaldehyde, a $C_{1-12}$-alkyl benzaldehyde, or a combination thereof, preferably wherein the plasticizer comprises a $C_{1-12}$-alkyl benzoate, a $C_{1-12}$-alkyl phenyl ketone, or a combination thereof; and, optionally, a crosslinking agent having a solubility of less than or equal to 20 milligrams/milliliter in the plasticizer at 25° C.

It will be understood that in the thermoset resin art, a "curable composition" can alternatively be referred to as an "organic bonding material" or "binding material" or "resin bond material," or "thermosetting composition" among other terms.

One component of the composition is a hydrogen-bonded prepolymer. In some embodiments, the hydrogen-bonded prepolymer are phenol-formaldehyde prepolymers, phenol-furfural prepolymers, aniline-formaldehyde prepolymers, urea-formaldehyde prepolymers, cresol-formaldehyde prepolymers, resorcinol-formaldehyde prepolymers, melamine-formaldehyde prepolymers, polyimides, polyurethanes (which includes polyester-based and polyether-based polyurethanes), epoxy resins, or a combination thereof. In some embodiments, the hydrogen-bonded prepolymer comprises a phenol-formaldehyde prepolymer. The phenol-formaldehyde prepolymer can be a novolac resin having a molar ratio of phenol to formaldehyde greater than 1, or a resol resin having a molar ratio of phenol to formaldehyde less than 1. Either the novolac resin or the resol resin can, optionally, have an elevated mole ratio of ortho to para linkages, for example an ortho to para mole ratio of 2:1 to 5:1 or higher.

In some embodiments, the hydrogen-bonded prepolymer has a glass transition temperature of 50 to 100° C., or 60 to 80° C., as determined by differential scanning calorimetry.

In addition to the hydrogen-bonded prepolymer, the composition comprises a plasticizer comprising a $C_{1-12}$-alkyl benzoate, a $C_{1-12}$-alkyl phenyl ketone, a $C_{1-12}$-alkyl phenylacetaldehyde, a $C_{1-12}$-alkyl benzaldehyde, or a combination thereof. In a preferred embodiment, the plasticizer comprises a $C_{1-12}$-alkyl benzoate, a $C_{1-12}$-alkyl phenyl ketone, or a combination thereof. As used herein, the term "alkyl" includes linear alkyl, branched alkyl, cyclic alkyl, alkyl groups having a combination of linear and cyclic groups, alkyl groups having a combination of branched and cyclic groups, or a combination thereof. Thus, "$C_{1-12}$-alkyl" includes $C_{1-12}$-n-alkyl, $C_{3-12}$ branched alkyl, and $C_{3-12}$ cyclic alkyl, among others. Specific examples of $C_{1-12}$-alkyl groups include methyl, ethyl, 1-propyl (n-propyl), 1-methylethyl (isopropyl), cyclopropyl, 1-butyl (n-butyl), 2-butyl, 2-methyl-1-propyl (sec-butyl), 1,1-dimethylethyl (tert-butyl), cyclobutyl, 1-methylcyclopropyl, 2-methylcyclopropyl, 1-pentyl (n-pentyl), 2-penyl, 3-pentyl, 2-methyl-1-butyl, 3-methyl-1-butyl, 2-methyl-2-butyl, 3-methyl-2-butyl, 2,2-dimethyl-1-propyl (neopentyl), cyclopentyl, 1-methylcyclobutyl, 2-methylcyclobutyl, 3-methylcyclobutyl, 1,2-dimethylcyclopropyl, 2,2-dimethylcyclopropyl, 2,3-dimethylcyclopropyl, 1-hexyl, 2-hexyl, 3-hexyl, 2-methyl-1-pentyl, 3-methyl-1-pentyl, 4-methyl-1-pentyl, 2-methyl-2-pentyl, 4-methyl-2-pentyl, 2-methyl-3-pentyl, 3-methyl-2-pentyl, 3-methyl-3-pentyl, 2,2-dimethyl-1-butyl, 3,3-dimethyl-1-butyl, 3,3-dimethyl-2-butyl, 2,3-dimethyl-1-butyl, 2,3-dimethyl-2-butyl, 1,2,2-trimethylcyclopropyl, 2,2,3-trimethylcyclopropyl, (1,2-dimethylcyclopropyl)methyl, (2,2-dimethylcyclopropyl)methyl, 1,2,3-trimethylcyclopropyl, (2,3-dimethylcyclopropyl)methyl, 2,2-dimethylcyclobutyl, 2,3-dimethylcyclobutyl, (1-methylcyclobutyl)methyl, 1,2-dimethylcyclobutyl, 2,3-dimethylcyclobutyl, (2-methylcyclobutyl)methyl, 1,3-dimethylcyclobutyl, 2,4-dimethylcyclobutyl, (3-methylcyclobutyl)methyl, 1-methylcyclopentyl, 2-methylcyclopentyl, cyclopentylmethyl, cyclohexyl, cycloheptyl, cyclooctyl, cyclononyl, cyclodecyl, cycloundecyl, cyclododecyl, n-heptyl, n-octyl, n-nonyl, n-decyl, n-undecyl, n-dodecyl, and 2-ethylhexyl.

The benzoate group of the $C_{1-12}$-alkyl benzoate can be unsubstituted or substituted with a $C_{1-12}$-alkyl group. Similarly, the phenyl group of the $C_{1-12}$-alkyl phenyl ketone can be unsubstituted or substituted with a $C_{1-12}$-alkyl group.

In some embodiments, the plasticizer comprises the $C_{1-12}$-alkyl benzoate. In some embodiments, the plasticizer comprises the $C_{1-12}$-alkyl phenyl ketone. In some embodiments, the plasticizer comprises a combination of the $C_{1-12}$-alkyl benzoate and the $C_{1-12}$-alkyl phenyl ketone.

In some embodiments, the $C_{1-12}$-alkyl benzoate has the structure (1)

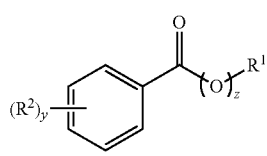

(1)

wherein $R^1$ and $R^2$ are independently at each occurrence $C_{1-12}$-alkyl, y is zero or 1, and z is 1. In some embodiments, the plasticizer comprises a $C_{1-12}$-n-alkyl benzoate, or a $C_{1-6}$-n-alkyl benzoate. In some embodiments, the plasticizer comprises methyl benzoate.

In some embodiments, the $C_{1-12}$-alkyl phenyl ketone has the structure (2)

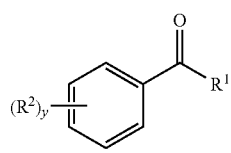

(2)

wherein $R^1$ and $R^2$ are independently at each occurrence $C_{1-12}$-alkyl and y is zero or 1. In some embodiments, the plasticizer comprises a $C_{1-12}$-n-alkyl phenyl ketone, or a $C_{1-6}$-n-alkyl phenyl ketone. In some embodiments, the plasticizer comprises acetophenone.

The plasticizer can, optionally, consist essentially of, or consist of the $C_{1-12}$-alkyl benzoate, the $C_{1-12}$-alkyl phenyl ketone, or the combination thereof. Alternatively, the plasticizer can comprise one or more plasticizers in addition to the $C_{1-12}$-alkyl benzoate, the $C_{1-12}$-alkyl phenyl ketone, or the combination thereof. In some embodiments, the plasticizer further comprises a plasticizer such as glycerol, furfural, furfuryl alcohol, cinnamaldehyde, anthracene oil, creosote oil, 2,2,4-trimethyl-1,3-pentanediol diisobutyrate, tung oil, cedarwood oil, castor oil, paraffin oil, methyl anthranilate, benzaldehyde, benzyl alcohol, $C_{1-12}$-alkoxy phenols, or a combination thereof. In some embodiments, the plasticizer further comprises methyl anthranilate, benzaldehyde, benzyl alcohol, a $C_{1-12}$-alkoxy phenol, or a combination thereof. When an additional plasticizer is present, the amount of the $C_{1-12}$-alkyl benzoate, the $C_{1-12}$-alkyl phenyl ketone, or the combination thereof, can be 10 to 99 weight percent (wt. %), or 50 to 95 wt. %, or 60 to 90 wt. %, based on the total weight of the plasticizer. Correspondingly, the amount of the additional plasticizer can be 1 to 90 wt. %, or 5 to 50 wt. %, or 10 to 40 wt. %, based on the total weight of the plasticizer.

In some embodiments, the composition comprises the hydrogen-bonded prepolymer and the plasticizer in amounts characterized by a ratio of moles of monomer equivalents of prepolymer to moles of plasticizer of 1:1 to 400:1, or 1:1 to 200:1, or 1:1 to 100:1, or 1:1 to 40:1, 2:1 to 40:1, or 4:1 to 30:1. For example, when the hydrogen-bonded prepolymer is a phenol-formaldehyde prepolymer, the "moles of monomer equivalents of prepolymer" refers to moles of phenol in the phenol-formaldehyde prepolymer.

In addition to the hydrogen-bonded prepolymer and the plasticizer, the composition optionally comprises a crosslinking agent. The crosslinking agent can have a solubility of less than or equal to 20 milligrams per milliliter (mg/mL), or less than or equal to 10 mg/mL, in the plasticizer at 25° C. In some embodiments, the crosslinking agent can have a solubility of less than or equal to 20 mg/mL, or less than or equal to 10 mg/mL, in methyl benzoate at 25° C. The crosslinking agent can be hexamethylenetetramine, paraformaldehyde, divinylbenzene, polyisocyanates (including diisocyanates), multifunctional amines (including diamines), ethylenically unsaturated compounds (e.g., $C_{1-12}$-alkyl (meth)acrylates, styrene, styrene derivatives, and the like), or a combination thereof. In some embodiments, the crosslinking agent comprises hexamethylenetetramine. In some embodiments, the crosslinking agent excludes organic isocyanates, such as diisocyanates, polyisocyanates, and polymeric isocyanates, and any other isocyanates that can be used in the formation of polyurethanes. In other words, in these embodiments, the crosslinking agent cannot react with the hydrogen-bonded prepolymer to form a polyurethane.

In some embodiments, the composition comprises the hydrogen-bonded prepolymer and the hydrogen-bonded prepolymer and the crosslinking agent in a ratio of moles of monomer equivalents of prepolymer to moles of crosslinking agent of 2:1 to 135:1, or 2:1 to 25:1, or 4:1 to 16:1. For example, when the hydrogen-bonded prepolymer is a phenol-formaldehyde prepolymer and the crosslinking agent is hexamethylenetetramine, the "moles of monomer equivalents of prepolymer" refers to moles of phenol in the phenol-formaldehyde prepolymer, and the "moles of crosslinking agent" refers to moles of hexamethylenetetramine.

The composition can, optionally, further comprise a filler. In some embodiments, the filler is aluminum silicate, calcium silicate, iron silicate, zirconium silicate, fused silica, natural silica sand, boron nitride powder or granules, boron silicate powder or granules, boric oxide, boron trioxide, titanium oxide, titanium diboride, zirconium diboride, aluminum oxide (alumina), aluminum oxynitride, antimony trisulfide, magnesium oxide, zirconium oxide, alumina-zirconia, boron-alumina, calcium sulfate, calcium carbonate, mica, clay, montmorillonite, sodio-montmorillonite saponite, hectorite, beidellite, stevensite, nontronite, vermiculite, halloysite, swelling micas, kaolinite, talc, wollastonite, hollow glass spheres, solid glass spheres, silicate spheres, cenospheres, kaolin, silicon carbide, diamond, boron carbide, boron nitride, aluminum, bronze, iron, nickel, copper, zinc, carbon fibers, glass fibers, quartz fibers, molybdenum sulfide, zinc sulfide, barium titanate, barium ferrite, barium sulfate, glass flakes, silicon carbide flakes, aluminum diboride flakes, poly(ether ketone) fibers, polyimide fibers, polybenzoxazole fibers, poly(phenylene sulfide) fibers, polyester fibers, polyethylene fibers, aromatic polyamide fibers, aromatic polyimide fibers, polyetherimide fibers, polytetrafluoroethylene fibers, acrylic resin fibers, poly(vinyl alcohol) fibers, feldspar, bauxite, chromite, dolomite, mullite, fillite, nepheline syenite, quartz, quartzite, pyrite, cryolite, perlite, tripoli, diatomaceous earth, carbon black, or a combination thereof. In some embodiments, the filler comprises a metal oxide in which the metal is aluminum, chromium, cobalt, copper, iron, magnesium, molybdenum, nickel, palladium, platinum, potassium, sodium, tin, titanium, tungsten, zinc, zirconium, an alloy thereof, or a combination thereof. When present, the filler can be used in an amount of 10 to 900 parts by weight per 100 parts by weight hydrogen-bonded prepolymer.

The filler can, optionally, be surface treated with an adhesion promoter. Adhesion promoters can include, for example, chromium complexes, silanes, titanates, zircoaluminates, propylene maleic anhydride copolymers, reactive cellulose esters, or a combination thereof.

The composition can, optionally, further comprise one or more additives known in the thermoset art. Such additives include, for example, emulsifiers, colorants (including pigments and dyes), antimigration agents, coalescing agents, wetting agents, biocides, organosilanes, antifoam agents, antioxidants, light stabilizers, thermal stabilizers, or a combination thereof.

In a specific embodiment of the composition, the hydrogen-bonded prepolymer comprises a phenol-formaldehyde prepolymer having a molar ratio of phenol to formaldehyde greater than 1; and the plasticizer comprises methyl benzoate. In this embodiment, the composition can, optionally, comprise the hydrogen-bonded prepolymer and the plasticizer in amounts characterized by a ratio of moles of monomer equivalents of prepolymer to moles of plasticizer of 1:1 to 400:1. Also in this embodiment, the composition can, optionally, comprise the crosslinking agent, wherein the crosslinking agent comprises hexamethylenetetramine. When the crosslinking agent is present, the hydrogen-bonded prepolymer and the crosslinking agent can, optionally, be present in amounts characterized by a ratio of moles of monomer equivalents of prepolymer to moles of crosslinking agent of 2:1 to 135:1.

Another embodiment is a method of forming a cured resin, comprising: reacting a hydrogen-bonded prepolymer and, optionally, a crosslinking agent in the presence of a plasticizer comprising a $C_{1-12}$-alkyl benzoate, a $C_{1-12}$-alkyl phenyl ketone, a $C_{1-12}$-alkyl phenylacetaldehyde, a $C_{1-12}$-alkyl benzaldehyde, or a combination thereof, preferably wherein the plasticizer comprises a $C_{1-12}$-alkyl benzoate, a $C_{1-12}$-alkyl phenyl ketone, or a combination thereof. All of the variations described above in the context of the composition apply as well to the method of forming a cured resin. The reaction of the hydrogen-bonded prepolymer with itself or the crosslinking agent can be conducted at a temperature of 20 to 200° C., or 30 to 180° C. Specific curing conditions are described in the working examples below. Another embodiment is a cured resin obtained by any of the variations of the method.

Another embodiment is a crosslinked composition, comprising: a hexamethylenetetramine-crosslinked phenol-formaldehyde resin, and a $C_{1-12}$-alkyl benzoate, a $C_{1-12}$-alkyl phenyl ketone, or a combination thereof. In this embodiment, the $C_{1-12}$-alkyl benzoate, the $C_{1-12}$-alkyl phenyl ketone, or the combination thereof is a residue of the plasticizer present in the uncrosslinked composition, the residual plasticizer having become entrapped in the crosslinked composition. In some embodiments, the crosslinked composition comprises the $C_{1-12}$-alkyl benzoate, or a $C_{1-12}$-n-alkyl benzoate, or a $C_{1-6}$-n-alkyl benzoate, or methyl benzoate. In some embodiments, the crosslinked composition comprises the $C_{1-12}$-alkyl phenyl ketone, or a $C_{1-12}$-n-alkyl phenyl ketone, or a $C_{1-6}$-n-alkyl phenyl ketone, or acetophenone. The concentration of the $C_{1-12}$-alkyl benzoate, the $C_{1-12}$-alkyl phenyl ketone, or the combination thereof in the hexamethylenetetramine-crosslinked phenol-formaldehyde resin can vary widely and depends on factors including the concentration of plasticizer in the uncrosslinked composition, and exposure of the crosslinked resin to elevated temperature and reduced pressure. In general, the concentration of the $C_{1-12}$-alkyl benzoate, the $C_{1-12}$-alkyl phenyl ketone, or the combination thereof in the crosslinked composition is 1 part per million by weight to 1 part per thousand by weight, based on the total weight of the crosslinked composition. This range is in contrast to the concentration of the $C_{1-12}$-alkyl benzoate, the $C_{1-12}$-alkyl phenyl ketone, or the combination thereof in the curable composition, which is 1 part per thousand by weight to 50 parts per hundred by weight.

Other embodiments include articles comprising the crosslinked resin or the crosslinked composition. Such articles include, for example, billiard balls, laminates, countertops, bonded abrasives, coated abrasives, bearings, micro-balloons, brake pads, brake shoes, clutch disks, and loudspeaker driver suspension components.

The invention is further illustrated by the following non-limiting examples.

EXAMPLES

Materials. Phenol-formaldehyde prepolymer and hexamethylenetetramine (HMTA; >99% crystalline based on differential scanning calorimetry (DSC)) were obtained from Saint-Gobain Corporation. Based on carbon-13 nuclear magnetic resonance ($^{13}$C NMR) spectroscopy, the phenol-formaldehyde prepolymer had a random configuration with a ratio of ortho-ortho:ortho-para:para-para linkages of 1:2:1. J. P. Patel et al., *J. Polym. Sci. Part B: Polym. Phys.*, 2015, vol. 53, pp. 1519-1526. The number average molecular weight of the prepolymer was 1,117 grams/mole (polydispersity index 2.5) in tetrahydrofuran (THF) as determined by gel permeation chromatography (GPC) using polystyrene standards. The prepolymer contained 1.83 (weight/weight) percent water, as determined using proton nuclear magnetic resonance ($^1$H NMR) spectroscopy. Methyl benzoate (99%) was obtained from Alfa Aesar.

HMTA was ground in a dry box to reduce the particle size and then mixed with an appropriate amount of the prepolymer. When plasticizer was needed, methyl benzoate was added dropwise into that mixture in a 20 milliliter glass vial. This resulting mixture was then ground with a mortar and pestle at liquid nitrogen temperature to achieve a uniform dispersion. The mortar with mixture was always kept and ground in a dry box with a relative humidity less than ten percent. The low relative humidity inside the dry box was maintained by flushing with nitrogen gas. The mixture of prepolymer, HMTA, and plasticizer (if any) was ground for 1 to 2 minutes to achieve uniformity. This uniform mixture was then used in DSC, infrared and low-field nuclear magnetic resonance (LFNMR) analyses.

Instrumentation. A Q100 TA DSC instrument with an RCS cooling system was used for the measurement of both glass transition temperature and the curing energy. Each sample after equilibration was heated at a 10° C./minute from −20 to 110° C. For each mixture, the glass transition temperature ($T_g$) of the second heating was used. The measurement of curing energy was conducted by heating at 5° C./minute from −20 to 280° C. Each experiment was repeated at least three times and the average value was reported. A similar protocol was used to measure the curing energy. A hermetic aluminum pan from Perkin Elmer was used for the curing energy measurement experiment. One pan held approximately 2 to 4 milligrams (mg) of the mixture of prepolymer, HMTA, and plasticizer. The other pan was empty and used as a reference pan in the DSC experiment.

A Perkin Elmer Spectrum 100 was used for mid-infrared analysis. The samples studied were cured at different temperatures from 30 to 180° C. All infrared data were obtained at room temperature. The Attenuated Total Reflectance (ATR) technique (diamond crystal) proved to be convenient to use for both solid and liquid samples. 256 Scans of 1 cm$^{-1}$ resolution were signal averaged. When near infrared data were needed, 32 scans of 1 cm$^{-1}$ resolution were signal averaged.

For compositional analysis, a Bruker 400 megahertz (MHz) NMR instrument was used. The solubility of crosslinking agent, HMTA, in methyl benzoate was measured by using duroquinone as the internal standard. Two main reasons for choosing duroquinone an internal standard are that duroquinone is highly soluble in methyl benzoate; and that, resonances assigned to duroquinone do not overlap those of the methyl benzoate, HMTA, or prepolymer.

Approximately 100 to 120 mg of cured sample was used for LFNMR analysis at 50° C. (the standard instrument temperature for LFNMR analysis). The LFNMR tube was obtained from Norell. The sample was equilibrated at 50° C. for at least 30 minutes. The $T_1$ relaxation time was measured using the conventional inverse pulse sequence method (180-τ-90) with 30 data points and 4 scans for each data point. The collected data points were fitted in the one exponential $T_1$ relaxation curve (equation 1) using software provided by Bruker MQ20.

$$M_z = M_o\left(1 - 2e^{-\left(\frac{\tau}{T_1}\right)}\right) \quad (1)$$

where $M_z$ is the nuclear spin magnetization measured as a function of time and the initial value, $M_o$.

Results and Discussion

Although component amounts are generally expressed as mole ratios, the Table below provides component amounts in weight percent based on the total weight of methyl benzoate, phenol-formaldehyde prepolymer, and HMTA. "PPmonomer" refers to monomer equivalents of prepolymer (i.e., moles of phenol in the phenol-formaldehyde prepolymer).

TABLE

| Methyl benzoate (MB) (% wt/wt) | Prepolymer (PP) (% wt/wt) | HMTA (% wt/wt) | Mole ratio PPmonomer:HMTA:MB |
|---|---|---|---|
| 0 | 85.8 | 14.2 | 8:1:0 |
| 4.5 | 81.9 | 13.6 | 8:1:0.3 |
| 7.3 | 79.5 | 13.2 | 8:1:0.6 |
| 9.5 | 77.7 | 12.9 | 8:1:0.8 |
| 14.8 | 73.1 | 12.1 | 8:1:1.2 |
| 17.5 | 70.8 | 11.7 | 8:1:1.5 |

Plasticization Efficiency.

The phenol-formaldehyde prepolymer is extremely rigid due to the extensive hydrogen bond network. Z. Katovic, M. Stefanic, Ind. &Eng. Chem. Prod. Res. Dev., 1985, vol. 24, pp. 179-185; B. L. Schurmann, L. Vogel, J. of Mat. Sci., 1996, vol. 31, pp. 3435-3440; T. T. Jones, J. of App. Chem., 1952, vol. 2, pp. 134-149. Although many of the details of the reaction mechanism and the reaction products remain to be characterized, there is no question that segmental mobility is a necessary condition for any reaction to take place. It is possible to disrupt the hydrogen bonds by elevating the sample temperature to facilitate the reaction between the phenol-formaldehyde resin and the crosslinking agent. T. T. Jones, J. of App. Chem., 1952, vol. 2, pp. 134-149. However, the crosslinking reaction is much more efficient when plasticizers are used. J. P. Patel, et al., J. of Polym Sci. Part B: Polym. Phys., 2015, vol. 53, pp. 1519-1526. Without being bound by theory, one of the key elements of an effective plasticizer is to disrupt the hydrogen bonded matrix, thereby producing free hydroxyl groups that facilitate dissolution of the crosslinking agent, such as HMTA, without suppressing the reactive sites. J. P. Patel, et al., J. Polym. Sci. Part B: Polym. Phys., 2015, vol. 53, pp. 1519-1526.

Figure 2:
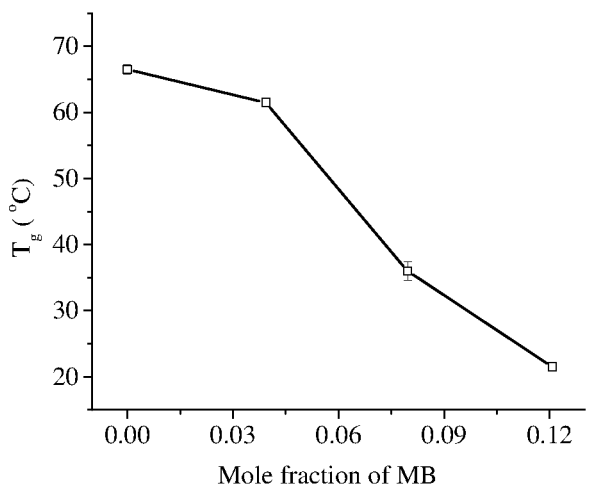
FIG. 2 is a plot of prepolymer glass transition temperature ($T_g$) as a function of mole fraction of methyl benzoate.

The phenol-formaldehyde resin has been characterized previously. J. P. Patel, et al., J. Polym. Sci. Part B: Polym. Phys., 2015, vol. 53, pp. 1519-1526. It has a low molecular weight corresponding to 10 monomer units. Yet it has a well-defined glass transition temperature ($T_g$) at 66-67° C. due to the hydrogen bonds present. By adding a small amount of methyl benzoate, the glass transition temperature of the prepolymer drops significantly as shown in FIG. 1. The thermograms clearly demonstrate the reduction in $T_g$ with data summarized in FIG. 2. This reduction in $T_g$ is comparable to other effective plasticizers studied. J. P. Patel, et al., J. Polym. Sci. Part B: Polym. Phys., 2015, vol. 53, pp. 1519-1526. As described below, the depression of $T_g$ or increase in the segmental mobility is not the sole means of expediting the crosslinking reaction.

The reduction of $T_g$ suggests that methyl benzoate has the ability to weaken the hydrogen bonding in phenol-formaldehyde prepolymer. As stated above, methyl benzoate is selected because of its ability to dissociate the phenol-formaldehyde resin while having weak specific interactions with HMTA. The second point is easy to demonstrate since HMTA is insoluble in methyl benzoate. In addition, no discernable NMR signals were measured that would suggest any soluble HMTA exists in methyl benzoate. J. P. Patel, et al., J. Polym. Sci. Part B: Polym. Phys., 2015, vol. 53, pp. 1519-1526. However, there is evidence showing the disruption of the hydrogen bonded matrix prepolymer when methyl benzoate is introduced.

There are three types of intermolecular interactions in the phenol-formaldehyde prepolymer that stabilizes its structure: π-π interactions, π-OH interactions, and, most prevalent, hydrogen-bonded hydroxyl groups. D. E. Rosenfeld, et al., *J. Physical Chem. B*, 2009, vol. 113, pp. 13300-13307; T. Cairns, G. Eglinton, *Nature*, 1962, vol. 196, pp. 535-537. Methyl benzoate has the physical features that can potentially disrupt all three types of intermolecular interactions. The specific infrared active features that can be used to characterize the changes are typically the O—H stretching, and ring stretching or ring bending vibrations of the phenol-formaldehyde prepolymer. The C=O stretching vibration of the ester groups in methyl benzoate also is extremely sensitive to changes in the intermolecular interactions.

Figure 3:
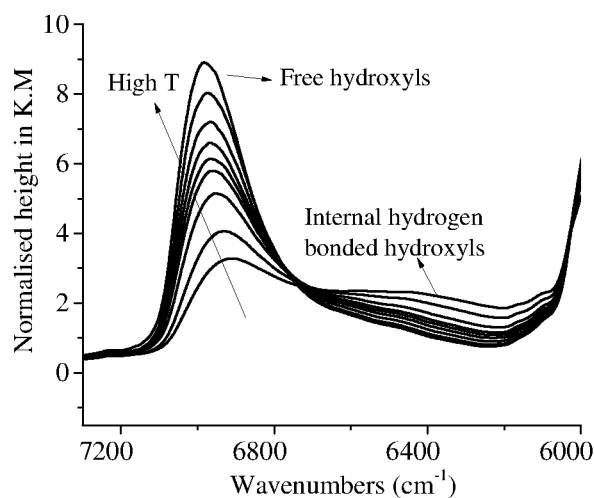
FIG. 3 presents overlaid, normalized infrared spectra (normalized height in Kubelka-Munk (K.M.) units versus wavenumber in reciprocal centimeters) of prepolymer with 0.12 mole fraction of methyl benzoate at 30, 70, 100, 120, 130, 140, 150, 160, and 180° C. The O—H stretching vibration (overtone) occurs at 6200 to 7200 centimeter$^{-1}$.
Figure 4:
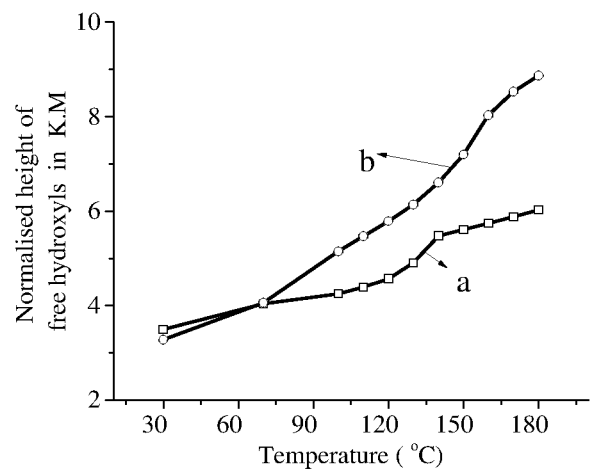
FIG. 4 is a plot of normalized intensity of free O—H vibrations as a function of temperature in (a) prepolymer without methyl benzoate, and (b) prepolymer with methyl benzoate at 0.12 mole fraction.

In conjunction with ATR mid-infrared spectroscopy, we have used near infrared spectroscopy to characterize the changes in the intermolecular interactions. As can be seen in FIG. 3, the hydrogen bonded component (at 6400 cm$^{-1}$) is cleanly separated from the O—H stretching (at 6940 cm$^{-1}$) for the component free of hydrogen bonding. The width of the hydrogen bonded component reflects the diverse hydrogen bonds formed in the prepolymer. As we have discussed previously, this prepolymer is random in configuration and capable of forming ortho- or para-linkages that would also influence the different formation of hydrogen bonds. J. D. Monk, et al., 2015, *Macromolecules*, vol. 48, pp. 7670-7680. At elevated temperatures, the free O—H stretching vibration is clearly present and can be used to monitor the structural changes. The influence of methyl benzoate is clearly seen in FIG. 4. The plasticization effect of methyl benzoate in freeing the OH groups is dramatic.

Figure 5:
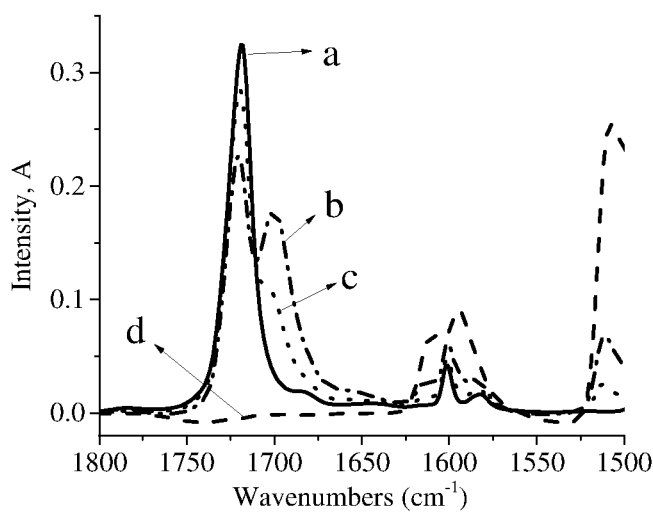
FIG. 5 presents overlaid infrared spectra for (a) pure methyl benzoate, (b) 600 milligrams/milliliter prepolymer in methyl benzoate, (c) 200 milligrams/milliliter prepolymer in methyl benzoate, and (d) pure prepolymer.

It is easy to monitor the changes in the C=O vibration of methyl benzoate at ambient temperature (23° C.). This vibration (at 1720 cm$^{-1}$) is extremely intense and shifts by nearly 20 cm$^{-1}$ (FIG. 5) when interacting with the hydroxyl units of the resin. The upward shift of the O—H stretching with the corresponding downward shift of the C=O stretching is characteristic of the interaction between methyl benzoate and the prepolymer.

Figure 6:
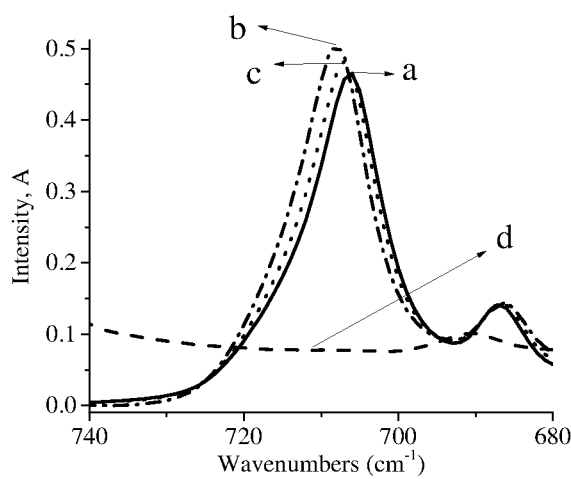
FIG. 6 presents overlaid infrared spectra showing the C—H ring bending vibration of methyl benzoate in the presence of various concentrations of prepolymer: (a) pure methyl benzoate, (b) 600 mg/ml prepolymer in methyl benzoate, (c) 200 mg/ml prepolymer in methyl benzoate (d) pure prepolymer.

As mentioned above, there are other two types of intermolecular or intramolecular interactions involving the aromatic rings in the prepolymer and between the prepolymer and methyl benzoate. Because of the various overlapping features the only band that can be employed to characterize the interactions is the C—H bending of the methyl benzoate aromatic ring in the 700 cm$^{-1}$ region (FIG. 6). Although the shift is small (~5 cm$^{-1}$), this ring vibration of methyl benzoate exhibits clear changes in the presence of the phenol-formaldehyde resin. The relative strengths of the three types of inter-molecular interactions have been well established with the hydrogen bonded interaction being the dominant one.

Figure 7:
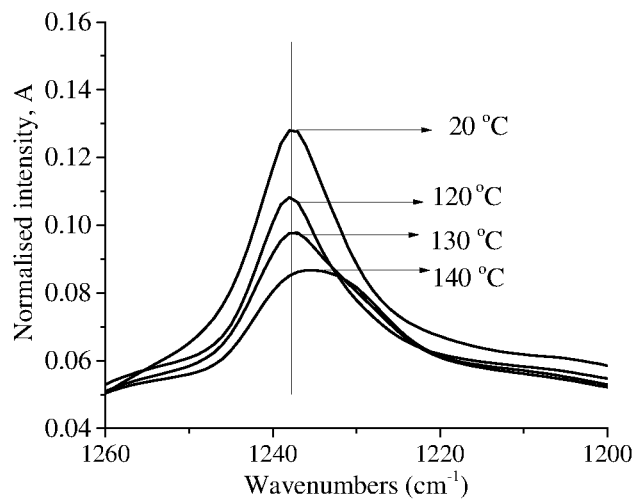
FIG. 7 presents overlaid infrared spectra showing the C—N—C stretching peak of HMTA in a sample with a 1:8 mole ratio of HMTA to phenol-formaldehyde prepolymer monomer (phenol) at different temperatures.
Figure 8:
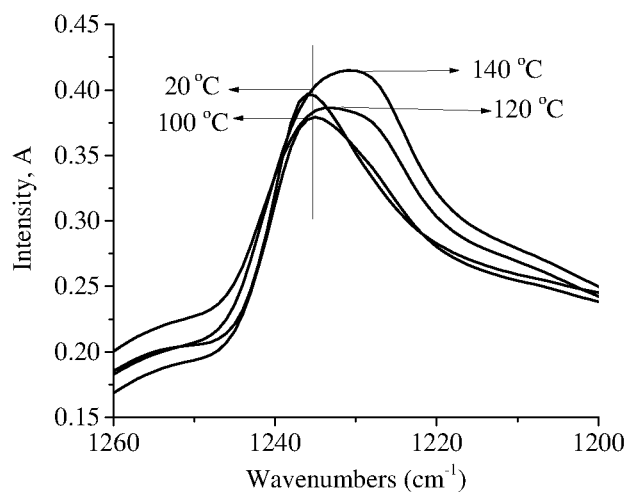
FIG. 8 presents overlaid infrared spectra showing the C—N—C stretching peak of HMTA in a sample with a 1:8:0.6 mole ratio of HMTA to phenol-formaldehyde prepolymer monomer (phenol) to methyl benzoate at different temperatures.

The highly mobile and the loosely interacting polymer chains of plasticized prepolymer can easily allow the cross-linking agent, HMTA, to enter between them. These plasticized phenol-formaldehyde systems will have a higher content of free hydroxyl groups than unplasticized phenol-formaldehyde systems. It has previously been shown that these free hydroxyls are responsible for the solvation of HMTA. J. P. Patel, et al., *J. Polym. Sci. Part B: Polym. Phys.*, 2015, vol. 53, pp. 1519-1526. In FIGS. 7 and 8, the solubilization process is monitored during the curing reaction by measuring the frequency shifting in C—N stretching band of HMTA for the unplasticized and plasticized resin. In hydrogen-bonded or solvated HMTA, the C—N stretching frequency shifts from 1235 downward to 1230 cm$^{-1}$. J. P. Patel, et al., *J. Polym. Sci. Part B: Polym. Phys.*, 2015, vol. 53, pp. 1519-1526. In the sample with 0.06 mole fraction methyl benzoate almost all the HMTA is solubilized at approximately 120° C. While in the sample without plasticizer, solvation of HMTA occurs at approximately 140° C. Using methyl benzoate as a plasticizer therefore reduces the solvation activation energy of HMTA. As stated above, it is the freeing of the prepolymer hydroxyl units that solubilizes HMTA.

HMTA is virtually insoluble in methyl benzoate. Using duroquinone as an internal standard our proton NMR spectra revealed a solubility of no more than 5 milligrams of HMTA per milliliter of methyl benzoate. The high solubility of HMTA results directly from the plasticized phenol-formaldehyde prepolymer. In the context of a phenol-formaldehyde prepolymer/HMTA system plasticized with furfural, we previously postulated that a two-step process is necessary for the reaction of phenol-formaldehyde prepolymer with HMTA in the presence of plasticizer: first, the plasticizer does not directly interact with HMTA but instead disrupts hydrogen bonding within the prepolymer; and second, the plasticized (i.e., hydrogen-bond-disrupted) prepolymer solubilizes and reacts with the HMTA. J. P. Patel, et al., *J. Polym. Sci. Part B: Polym. Phys.*, 2015, vol. 53, pp. 1519-1526. These observations are consistent with operation of the same two-step mechanism when the plasticizer is methyl benzoate: first, methyl benzoate does not directly interact with HMTA but it plasticizes the prepolymer, and the plasticized prepolymer then solubilizes and reacts with HMTA. In this scheme methyl benzoate indirectly increases the interaction between the two reactants, the crosslinking agent HMTA and the phenol-formaldehyde prepolymer.

Figure 9:
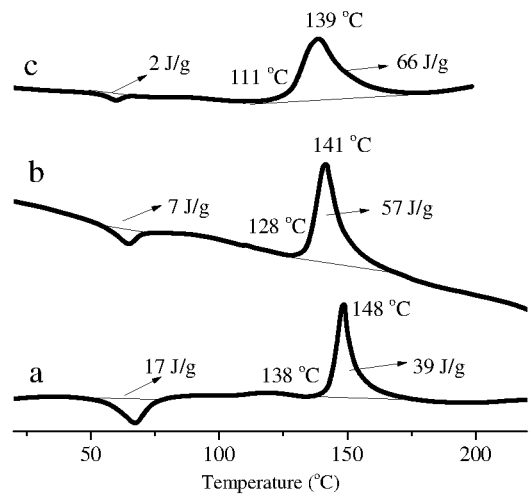
FIG. 9 illustrates the effect of methyl benzoate on curing energy for phenol-formaldehyde prepolymer and HMTA. DSC traces are presented for (a) an 8:1 mole ratio of prepolymer monomer to HMTA (no plasticizer); (b) an 8:1:0.6 mole ratio of prepolymer monomer (phenol) to HMTA to methyl benzoate; and (c) 8:1:1.2 mole ratio of prepolymer monomer to HMTA to methyl benzoate.
Figure 10:
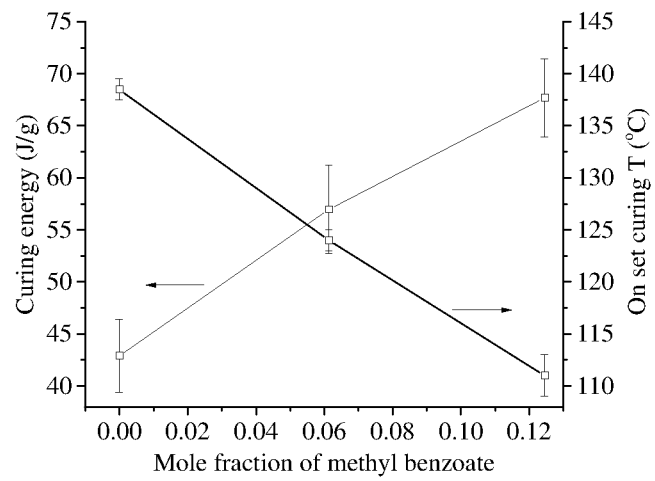
FIG. 10 is a plot of curing energy and curing onset temperature, each for the reaction of phenol-formaldehyde prepolymer with HMTA as a function of mole fraction of methyl benzoate.

The curing process is demonstrated in FIG. 9. The endotherm seen at ~60° C. is associated with the glass transition of the prepolymer. The exotherms are associated with the crosslinking process. It is clear that with the addition of methyl benzoate there is a lowering of curing temperature. In addition, it is also clear that the curing energy or the degree of crosslinking increases with the use of methyl benzoate, as shown in FIG. 10.

The principal role of methyl benzoate is to plasticize the phenol-formaldehyde prepolymer, which then dissolves HMTA for the crosslinking reaction. Therefore, it is important to assess the number of available sites, f, that are actually utilized as a function of the amount of plasticizer present, as shown in equation 2. HMTA has 4 nitrogen atoms and 6 methylene units. In the ideal case, these 6 methylene units can form 12 different chemical bonds with the unreacted ortho or para reactive sites of the phenol-formaldehyde prepolymer. Thus the maximum functionality of the HMTA molecule is 12. Using DSC curing energy and equation 2, the functionalities of HMTA reacted with different concentrations of plasticizer were calculated. The total reaction energy expected, $\Delta H_{total}$, is calculated using the group contribution as before. J. P. Patel, et al., *J. Polym. Sci. Part B: Polym. Phys.*, 2015, vol. 53, pp. 1519-1526. Both the solvation/dissociation of HMTA and the subsequent reaction need to be incorporated in the calculation. We obtained a value of 294 kJ/mole for $\Delta H_{total}$. The detailed explanation of the calculation has been provided previously. J. L. Holmes, C. Aubry, *J. Physical Chem. A*, 2011, vol. 115, pp. 10576-10586; J. L. Holmes, C. Aubry, *J. Physical Chem. A*, 2012, vol. 116, pp. 7196-7209; M. Harvey, L. H. Baekeland, *J. Ind. & Eng. Chem.*, 1921, vol. 13, pp. 135-141.

$$\text{Reacted functionalities } HMTA, \ f = \frac{12(\Delta H \text{ of curing reaction})}{(\Delta H_{total})} \quad (2)$$

Since HMTA is virtually insoluble in methyl benzoate, the total exotherm in DSC (FIG. 9) was considered to be associated with HMTA reaction alone, and this calculation of functionality (FIG. 11) is an upper estimate of the functionality associated with the HMTA that can react.

Monitoring the Crosslinking Reaction with the Use of Methyl Benzoate.

Even with a detailed analysis of the thermal and infrared data, it is difficult to prove directly that plasticization increases the degree of crosslinking. As mentioned previously, the prepolymer and HMTA curing reaction is complex since 15 or more different types of linkages can occur. G. R. Hatfield, G. E. Maciel, *Macromolecules*, 1987, vol. 20, pp. 608-615; T. R. Dargaville, et al., *J. Polym. Sci. Part A: Polym. Chem.*, 1997, vol. 35, pp. 1389-1398; X. Zhang, et al., *Polym.*, 1997, vol. 38, pp. 5835-5848. Many of these linkages act only as a dangling chain and do not yield the crosslinks needed for effective mechanical properties. G. R. Hatfield, G. E. Maciel, *Macromolecules*, 1987, vol. 20, pp. 608-615; T. R. Dargaville, et al., *J. Polym. Sci. Part A: Polym. Chem.*, 1997, vol. 35, pp. 1389-1398; X. Zhang, et al., *Polym.*, 1997, vol. 38, pp. 5835-5848. It is difficult to differentiate the various linkages using infrared spectroscopy. The most direct method to seek information on the crosslinking process and the degree of crosslinking achieved is to use low field NMR (LFNMR). H. S. Gutowsky, et al., *J. Chem. Phys.*, 1957, vol. 27, pp. 534-542. This technique directly measures the segmental dynamics that are correlated to the $T_1$ spin-lattice or the $T_2$ spin-spin relaxations. F. A. Bovey, P. A. Mirau, "NMR of Polymers", Academic Press: San Diego, 1996. For such rigid materials such as crosslinked phenol-formaldehyde resin we have elected to use the $T_1$ spin-lattice measurements to obtain information regarding the degree of crosslinking, with supporting the analyses based on DSC and infrared data.

Figure 12:
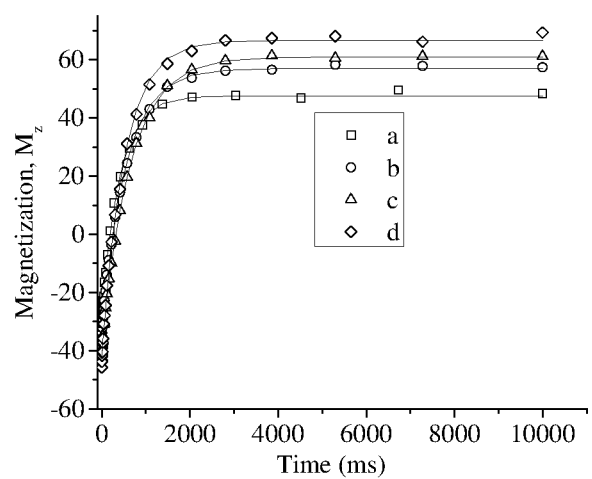
FIG. 12 is a plot of magnetization versus time for $T_1$ spin relaxation of 180° C. cured samples, (a) 8:1 mole ratio of prepolymer monomer to HMTA (no plasticizer); (b) 8:1:0.4 mole ratio of prepolymer monomer to HMTA to methyl benzoate; (c) 8:1:0.8 mole ratio of prepolymer monomer to HMTA to methyl benzoate; (d) 8:1:1.2 mole ratio of prepolymer monomer to HMTA to methyl benzoate.

The spin-lattice relaxations for phenol-formaldehyde resins during curing, with and without benzoate, are shown in FIG. 12. All the data were fitted with one exponential fitting equation (equation 1).

Figure 13:
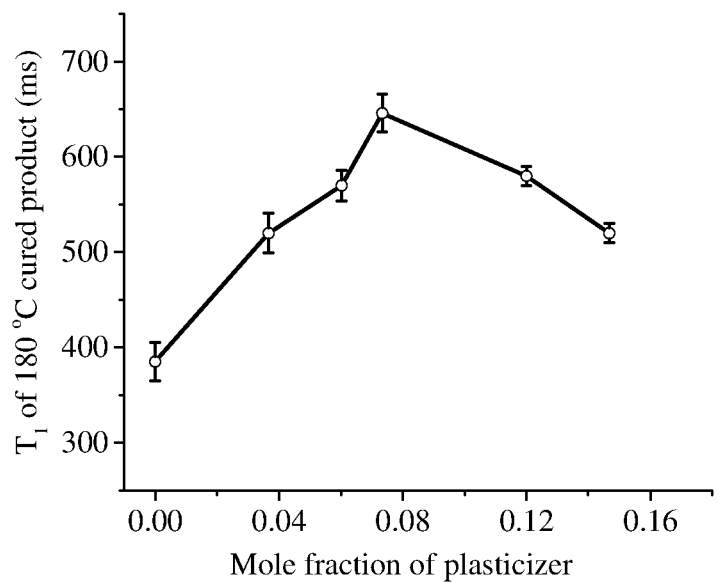
FIG. 13 is a plot of $T_1$ measured for the crosslinked resin as a function of methyl benzoate mole fraction.

The $T_1$ relaxation times measured for the prepolymer and HMTA with different concentrations of methyl benzoate are shown in FIG. 13. The increase in T1 as a function of increasing methyl benzoate concentration agrees well with the DSC and infrared data and is consistent with our expectations for such a rigid crosslinked system. The drop off in relaxation at extremely high concentrations of methyl benzoate is interesting. It suggests there is a maximum of efficiency as a function of plasticizer concentration.

Figure 11:
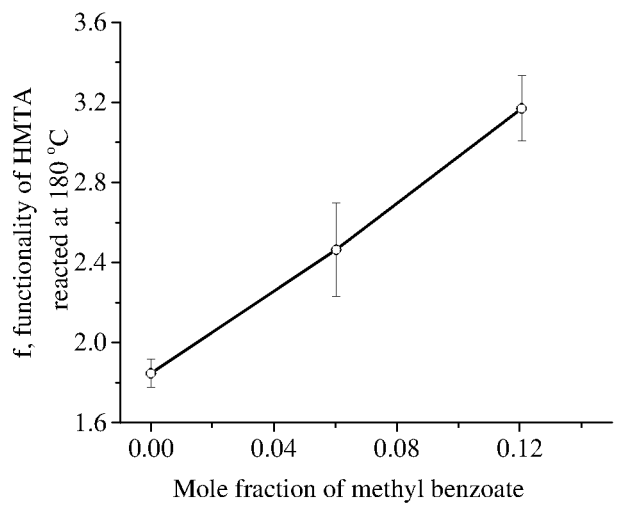
FIG. 11 is a plot of HMTA reacted functionality versus mole fraction of methyl benzoate.

As seen in FIG. 11, the actual number of crosslinks formed is only a small fraction of the sites available, no more than 33%. Although only one bond is needed between every two chains to form a gel state, the modulus of a crosslinked system depends on the crosslink density. The objective for a high performance system is to raise the crosslink density to be as high as possible. The addition of methyl benzoate certainly enables that process to occur. However, methyl benzoate also disrupts the phenol-formaldehyde resin and adds free vol., thus increasing segmental mobility. Therefore, again without being bound by theory, the addition of too much plasticizer actually increases segmental mobility to reduce the merits of the crosslinking reaction as shown in FIG. 13. In other words, there is an optimum concentration range for the alkyl benzoate, beyond which any benefit of any additional crosslinking is outweighed by the detriment of plasticizing the crosslinked matrix.

As seen in FIG. 11, the actual number of crosslinks formed is only a small fraction of the sites available, no more than 33%. Although only one bond is needed between every two chains to form a gel state, the modulus of a crosslinked system depends on the crosslink density. The objective for a high performance system is to raise the crosslink density to be as high as possible. The addition of methyl benzoate certainly enables that process to occur. However, methyl benzoate also disrupts the phenol-formaldehyde resin and adds free vol., thus increasing segmental mobility. Therefore, it is our hypothesis that the addition of too much plasticizer actually increases segmental mobility to reduce the merits of the crosslinking reaction as shown in FIG. 13. In other words, there is an optimum concentration range for the alkyl benzoate, beyond which any benefit of any additional crosslinking is outweighed by the detriment of plasticizing the crosslinked matrix.

Figure 14:
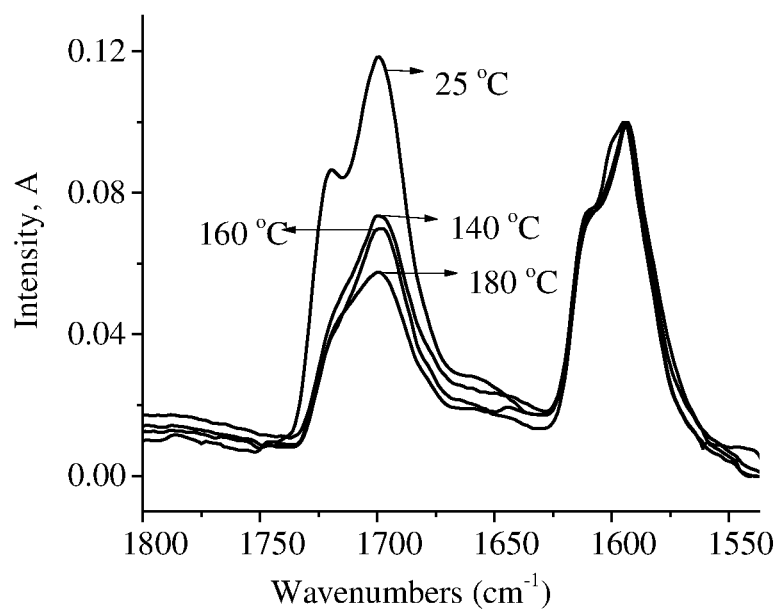
FIG. 14 presents overlaid infrared spectra for prepolymer/HMTA/methyl benzoate mixtures as a function of temperature. The mole ratio was 8:1:0.6 for monomer equivalents of prepolymer to HMTA to methyl benzoate. The methyl benzoate C=O stretch is centered at 1720 centimeter$^{-1}$ and shifts to 1699 centimeter$^{-1}$ when methyl benzoate interacts with prepolymer.

Another feature of methyl benzoate is that no evidence has been found that it reacted during the curing reaction, as shown in FIG. 14. The carbonyl stretching vibration did not change with temperature as the curing reaction proceeded. Due to ring positive charge nature in this case, it is very difficult to carry out any electrophilic substitution reaction. This plasticizer neither reacts during the curing nor interacts with HMTA. Therefore, it does not block any functionality of HMTA, making it a very efficient plasticizer.

These experiments demonstrate the use and benefits of a non-reactive class of plasticizers for the reaction of a hydrogen-bonded prepolymer and a crosslinking agent whose solubility is enhanced by a hydrogen-bond-disrupted form of the prepolymer. The plasticizer appears not to interact directly with the crosslinking agent, but instead increases the segmental mobility and the number of free hydroxyl units in the hydrogen bonded prepolymer. The plasticizer increases both the rate and extent of the crosslinking reaction.

The invention includes at least the following embodiments.

Embodiment 1

A curable composition, comprising: a hydrogen-bonded prepolymer; a plasticizer comprising a $C_{1-12}$-alkyl benzoate, a $C_{1-12}$-alkyl phenyl ketone, a $C_{1-12}$-alkyl phenylacetaldehyde, a $C_{1-12}$-alkyl benzaldehyde, or a combination thereof, preferably wherein the plasticizer comprises a $C_{1-12}$-alkyl benzoate, a $C_{1-12}$-alkyl phenyl ketone, or a combination thereof; and optionally, a crosslinking agent.

Embodiment 2

The composition of embodiment 1, wherein the hydrogen-bonded prepolymer is a phenol-formaldehyde prepolymer, phenol-furfural prepolymer, aniline-formaldehyde prepolymer, urea-formaldehyde prepolymer, cresol-formaldehyde prepolymer, resorcinol-formaldehyde prepolymer, melamine-formaldehyde prepolymer, reactive polyester, polyimide, polyurethane, epoxy resin, or a combination thereof.

Embodiment 3

The composition of embodiment 1, wherein the hydrogen-bonded prepolymer comprises a phenol-formaldehyde prepolymer.

Embodiment 4

The composition of embodiment 3, wherein the phenol-formaldehyde prepolymer has a molar ratio of phenol to formaldehyde greater than 1.

Embodiment 5

The composition of any one of embodiments 1-4, wherein the plasticizer comprises the $C_{1-12}$-alkyl benzoate.

Embodiment 6

The composition of embodiment 5, wherein the $C_{1-12}$-alkyl benzoate has the structure (1)

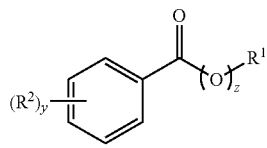

wherein $R^1$ and $R^2$ are independently at each occurrence $C_{1-12}$-alkyl, y is zero or 1, and z is 1.

Embodiment 7

The composition of embodiment 5, wherein the $C_{1-12}$-alkyl benzoate comprises a $C_{1-12}$-n-alkyl benzoate.

Embodiment 8

The composition of embodiment 5, wherein the $C_{1-12}$-alkyl benzoate comprises methyl benzoate.

Embodiment 9

The composition of any one of embodiments 1-8, wherein the plasticizer comprises the $C_{1-12}$-alkyl phenyl ketone.

Embodiment 10

The composition of embodiment 9, wherein the $C_{1-12}$-alkyl phenyl ketone has the structure (2)

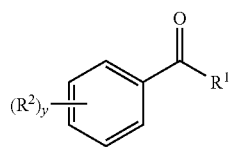

wherein $R^1$ and $R^2$ are independently at each occurrence $C_{1-12}$-alkyl and y is zero or 1.

Embodiment 11

The composition of embodiment 9, wherein the $C_{1-12}$-alkyl phenyl ketone comprises a $C_{1-12}$-n-alkyl phenyl ketone.

Embodiment 12

The composition of embodiment 9, wherein the $C_{1-12}$-alkyl phenyl ketone comprises acetophenone.

Embodiment 13

The composition of any one of embodiments 1-12, wherein the plasticizer further comprises a plasticizer that is glycerol, furfural, furfuryl alcohol, cinnamaldehyde, anthracene oil, creosote oil, 2,2,4-trimethyl-1,3-pentanediol diisobutyrate, tung oil, cedarwood oil, castor oil, paraffin oil, $C_{1-12}$-alkoxy phenols, methyl anthranilate, benzaldehyde, benzyl alcohol, $C_{1-12}$-alkyl phenylacetaldehyde, $C_{1-12}$-alkyl benzaldehyde or a combination thereof.

Embodiment 14

The composition of any one of embodiments 1-12, wherein the plasticizer further comprises a plasticizer that is methyl anthranilate, benzaldehyde, benzyl alcohol, $C_{1-12}$-alkoxy phenols, or a combination thereof.

Embodiment 15

The composition of any one of embodiments 1-14, comprising the hydrogen-bonded prepolymer and the plasticizer in amounts characterized by a ratio of moles of monomer equivalents of prepolymer to moles of plasticizer of 1:1 to 400:1.

Embodiment 16

The composition of any one of embodiments 1-15, wherein the composition comprises the crosslinking agent, and the crosslinking agent has a solubility of less than or equal to 20 mg/mL in the plasticizer at 25° C.

Embodiment 17

The composition of any one of embodiments 1-15, wherein the composition comprises the crosslinking agent, and wherein the crosslinking agent is hexamethylenetetramine, paraformaldehyde, divinylbenzene, polyisocyanates (including diisocyanates), multifunctional amines (including diamines), ethylenically unsaturated compounds, for example, $C_{1-12}$-alkyl (meth)acrylates, styrene, or styrene derivatives, or a combination thereof.

Embodiment 18

The composition of any one of embodiments 1-15, wherein the crosslinking agent is present and comprises hexamethylenetetramine.

Embodiment 19

The composition of any one of embodiments 1-18, comprising the hydrogen-bonded prepolymer and the crosslinking agent in amounts characterized by a ratio of moles of monomer equivalents of prepolymer to moles of crosslinking agent of 2:1 to 135:1.

Embodiment 20

The composition of any one of embodiments 1-19, further comprising a filler.

Embodiment 21

The composition of embodiment 20, wherein the filler is aluminum silicate, calcium silicate, iron silicate, zirconium silicate, fused silica, natural silica sand, boron nitride powder or granules, boron silicate powder or granules, boric oxide, boron trioxide, titanium oxide, titanium diboride, zirconium diboride, aluminum oxide (alumina), aluminum oxynitride, antimony trisulfide, magnesium oxide, zirconium oxide, other metal oxides in which the metal is chromium, cobalt, copper, iron, molybdenum, nickel, palladium, platinum, potassium, sodium, tin, titanium, tungsten, zinc, an alloy thereof, or a combination thereof, alumina-zirconia, boron-alumina, calcium sulfate, calcium carbonate, mica, clay, montmorillonite, sodio-montmorillonite saponite, hectorite, beidellite, stevensite, nontronite, vermiculite, halloysite, swelling micas, kaolinite, talc, wollastonite, hollow glass spheres, solid glass spheres, silicate spheres, cenospheres, kaolin, silicon carbide, diamond, boron carbide, boron nitride, aluminum, bronze, iron, nickel, copper, zinc, carbon fibers, glass fibers, quartz fibers, molybdenum sulfide, zinc sulfide, barium titanate, barium ferrite, barium sulfate, glass flakes, silicon carbide flakes, aluminum diboride flakes, poly(ether ketone) fibers, polyimide fibers, polybenzoxazole fibers, poly(phenylene sulfide) fibers, polyester fibers, polyethylene fibers, aromatic polyamide fibers, aromatic polyimide fibers, polyetherimide fibers, polytetrafluoroethylene fibers, acrylic resin fibers, poly(vinyl alcohol) fibers, feldspar, bauxite, chromite, dolomite, mullite, fillite, nepheline syenite, quartz, quartzite, pyrite, cryolite, perlite, tripoli, diatomaceous earth, carbon black, or a combination thereof.

Embodiment 22

The composition of embodiment 20 or 21, comprising 10 to 900 parts by weight filler per 100 parts by weight hydrogen-bonded prepolymer.

Embodiment 23

The composition of embodiment 1, wherein the hydrogen-bonded prepolymer comprises a phenol-formaldehyde prepolymer having a molar ratio of phenol to formaldehyde greater than 1; and wherein the plasticizer comprises methyl benzoate.

Embodiment 24

The composition of embodiment 23, comprising the hydrogen-bonded prepolymer and the plasticizer in amounts characterized by a ratio of moles of monomer equivalents of prepolymer to moles of plasticizer of 1:1 to 400:1.

Embodiment 25

The composition of embodiment 23 or 24, wherein the composition comprises the crosslinking agent, and wherein the crosslinking agent comprises hexamethylenetetramine.

Embodiment 26

The composition of embodiment 25, comprising the hydrogen-bonded prepolymer and the crosslinking agent in amounts characterized by a ratio of moles of monomer equivalents of prepolymer to moles of crosslinking agent of 2:1 to 135:1.

Embodiment 27

A method of forming a cured resin, comprising: reacting a hydrogen-bonded prepolymer and, optionally, a crosslinking agent, in the presence of a plasticizer; wherein the plasticizer comprises a $C_{1-12}$-alkyl benzoate, a $C_{1-12}$-alkyl phenyl ketone, a $C_{1-12}$-alkyl phenylacetaldehyde, a $C_{1-12}$-alkyl benzaldehyde or a combination thereof.

Embodiment 28

The method of embodiment 27, wherein the hydrogen-bonded prepolymer is a phenol-formaldehyde prepolymer, phenol-furfural prepolymer, aniline-formaldehyde prepolymer, urea-formaldehyde prepolymer, cresol-formaldehyde prepolymer, resorcinol-formaldehyde prepolymer, melamine-formaldehyde prepolymer, reactive polyester, polyimide, polyurethane, epoxy resin, or a combination thereof.

Embodiment 29

The method of embodiment 27, wherein the hydrogen-bonded prepolymer comprises a phenol-formaldehyde prepolymer.

Embodiment 30

The method of embodiment 29, wherein the phenol-formaldehyde prepolymer has a molar ratio of phenol to formaldehyde greater than 1.

Embodiment 31

The method of any one of embodiments 27-30, wherein the plasticizer comprises the $C_{1-12}$-alkyl benzoate.

Embodiment 32

The method of embodiment 31, wherein the $C_{1-12}$-alkyl benzoate has the structure (1)

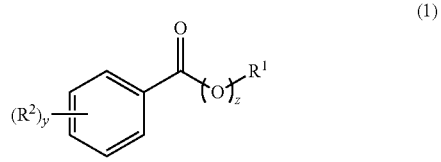

wherein $R^1$ and $R^2$ are independently at each occurrence $C_{1-12}$-alkyl, y is zero or 1, and z is 1.

Embodiment 33

The method of embodiment 31, wherein the $C_{1-12}$-alkyl benzoate comprises a $C_{1-12}$-n-alkyl benzoate.

Embodiment 34

The method of embodiment 31, wherein the $C_{1-12}$-alkyl benzoate comprises methyl benzoate.

Embodiment 35

The method of any one of embodiments 27-34, wherein the plasticizer comprises the $C_{1-12}$-alkyl phenyl ketone.

Embodiment 36

The method of embodiment 35, wherein the $C_{1-12}$-alkyl phenyl ketone has the structure (2)

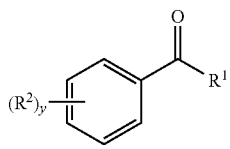

(2)

wherein $R^1$ and $R^2$ are independently at each occurrence $C_{1-12}$-alkyl and y is zero or 1.

Embodiment 37

The method of embodiment 35, wherein the $C_{1-12}$-alkyl phenyl ketone comprises a $C_{1-12}$-n-alkyl phenyl ketone.

Embodiment 38

The method of embodiment 35, wherein the $C_{1-12}$-alkyl phenyl ketone comprises acetophenone.

Embodiment 39

The method of any one of embodiments 27-38, wherein the plasticizer further comprises a plasticizer that is glycerol, furfural, furfuryl alcohol, cinnamaldehyde, anthracene oil, creosote oil, 2,2,4-trimethyl-1,3-pentanediol diisobutyrate, tung oil, cedarwood oil, castor oil, paraffin oil, $C_{1-12}$-alkoxy phenols, methyl anthranilate, benzaldehyde, benzyl alcohol, or a combination thereof.

Embodiment 40

The method of any one of embodiments 27-38, wherein the plasticizer further comprises methyl anthranilate, benzaldehyde, benzyl alcohol, $C_{1-12}$-alkoxy phenols, $C_{1-12}$-alkyl phenylacetaldehydes, $C_{1-12}$-alkyl benzaldehydes or a combination thereof.

Embodiment 41

The method of any one of embodiments 27-40, comprising the hydrogen-bonded prepolymer and the plasticizer in amounts characterized by a ratio of moles of monomer equivalents of prepolymer to moles of plasticizer of 1:1 to 400:1.

Embodiment 42

The method of any one of embodiments 27-41, wherein the crosslinking agent is present, and wherein the crosslinking agent has a solubility of less than or equal to 20 mg/mL in the plasticizer at 25° C.

Embodiment 43

The method of any one of embodiments 27-42, wherein the crosslinking agent is present and is hexamethylenetetramine, paraformaldehyde, divinylbenzene, polyisocyanates (including diisocyanates), multifunctional amines (including diamines), ethylenically unsaturated compounds, for example, $C_{1-12}$-alkyl (meth)acrylates, styrene, or styrene derivatives, or a combination thereof.

Embodiment 44

The method of any one of embodiments 27-42, wherein the crosslinking agent is present and comprises hexamethylenetetramine.

Embodiment 45

The method of any one of embodiments 27-44, wherein the hydrogen-bonded prepolymer and the crosslinking agent are present in amounts characterized by a ratio of moles of monomer equivalents of prepolymer to moles of crosslinking agent of 2:1 to 135:1.

Embodiment 46

The method of any one of embodiments 27-45, wherein said reacting is conducted in the further presence of a filler.

Embodiment 47

The method of embodiment 46, wherein the filler is aluminum silicate, calcium silicate, iron silicate, zirconium silicate, fused silica, natural silica sand, boron nitride powder and granules, boron silicate powder and granules, boric oxide, boron trioxide, titanium oxide, titanium diboride, zirconium diboride, aluminum oxide (alumina), aluminum oxynitride, antimony trisulfide, magnesium oxide, zirconium oxide, other metal oxides in which the metal is chromium, cobalt, copper, iron, molybdenum, nickel, palladium, platinum, potassium, sodium, tin, titanium, tungsten, zinc, an alloy thereof or a combination thereof, alumina-zirconia, boron-alumina, calcium sulfate, calcium carbonate, mica, clay, montmorillonite, sodio-montmorillonite saponite, hectorite, beidellite, stevensite, nontronite, vermiculite, halloysite, swelling micas, kaolinite, talc, wollastonite, hollow glass spheres, solid glass spheres, silicate spheres, cenospheres, kaolin, silicon carbide, diamond, boron carbide, boron nitride, aluminum, bronze, iron, nickel, copper, zinc, carbon fibers, glass fibers, quartz fibers, molybdenum sulfide, zinc sulfide, barium titanate, barium ferrite, barium sulfate, glass flakes, silicon carbide flakes, aluminum diboride flakes, poly(ether ketone) fibers, polyimide fibers, polybenzoxazole fibers, poly(phenylene sulfide) fibers, polyester fibers, polyethylene fibers, aromatic polyamide fibers, aromatic polyimide fibers, polyetherimide fibers, polytetrafluoroethylene fibers, acrylic resin fibers, poly(vinyl alcohol) fibers, feldspar, bauxite, chromite, dolomite, mullite, fillite, nepheline syenite, quartz, quartzite, pyrite, cryolite, perlite, tripoli, diatomaceous earth, carbon black, or a combination thereof.

Embodiment 48

The method of embodiment 46 or 47, wherein the filler is present at 10 to 900 parts by weight per 100 parts by weight hydrogen-bonded prepolymer.

Embodiment 49

The method of embodiment 27, wherein the hydrogen-bonded prepolymer comprises a phenol-formaldehyde prepolymer having a molar ratio of phenol to formaldehyde greater than 1; and wherein the plasticizer comprises methyl benzoate.

Embodiment 50

The method of embodiment 49, wherein the hydrogen-bonded prepolymer and the plasticizer are present in amounts characterized by a ratio of moles of monomer equivalents of prepolymer to moles of methyl benzoate of 1:1 to 220:1.

Embodiment 51

The method of embodiment 49 or 50, wherein the crosslinking agent is present and comprises hexamethylenetetramine.

Embodiment 52

The method of embodiment 51, wherein the hydrogen-bonded prepolymer and the crosslinking agent are present in amounts characterized by a ratio of moles of monomer equivalents of prepolymer to moles of crosslinking agent of 2:1 to 135:1.

Embodiment 53

A cured resin obtained by the method of any one of embodiments 22-52.

Embodiment 54

An article comprising the cured resin of embodiment 53.

Embodiment 55

A crosslinked composition, comprising: a hexamethylenetetramine-crosslinked phenol-formaldehyde resin; and a plasticizer comprising a $C_{1-12}$-alkyl benzoate, a $C_{1-12}$-alkyl phenyl ketone, a $C_{1-12}$-alkyl phenylacetaldehyde, a $C_{1-12}$-alkyl benzaldehyde, or a combination thereof, preferably wherein the plasticizer comprises a $C_{1-12}$-alkyl benzoate, a $C_{1-12}$-alkyl phenyl ketone, or a combination thereof.

Embodiment 56

The crosslinked composition of embodiment 55, wherein the plasticizer comprises a $C_{1-12}$-n-alkyl benzoate.

Embodiment 57

The crosslinked composition of embodiment 55, wherein the plasticizer comprises methyl benzoate.

Embodiment 58

The crosslinked composition of any one of embodiments 55-57, wherein the plasticizer comprises a $C_{1-12}$-n-alkyl phenyl ketone.

Embodiment 59

The crosslinked composition of any one of embodiments 55-57, wherein the plasticizer comprises acetophenone.

Embodiment 60

An article comprising the crosslinked composition of any one of embodiments 55-59.

Embodiment 61

The composition of Embodiment 1, wherein the hydrogen-bonded prepolymer is a phenol-formaldehyde prepolymer, phenol-furfural prepolymer, aniline-formaldehyde prepolymer, urea-formaldehyde prepolymer, cresol-formaldehyde prepolymer, resorcinol-formaldehyde prepolymer, melamine-formaldehyde prepolymer, reactive polyester, polyimide, polyurethane, epoxy resin, or a combination thereof.

Embodiment 62

The composition of Embodiment 61, wherein the hydrogen-bonded prepolymer comprises a phenol-formaldehyde prepolymer, wherein the phenol-formaldehyde prepolymer has a molar ratio of phenol to formaldehyde greater than 1.

Embodiment 63

The composition of any one of Embodiments 1 or 61-62, wherein the plasticizer wherein the $C_{1-12}$-alkyl benzoate has the structure

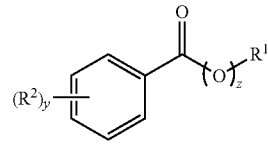

wherein $R^1$ and $R^2$ are independently at each occurrence $C_{1-12}$-alkyl, y is zero or 1, and z is 1, more preferably wherein the $C_{1-12}$-alkyl benzoate is a $C_{1-12}$-n-alkyl benzoate, and most preferably wherein the $C_{1-12}$-alkyl benzoate is methyl benzoate.

Embodiment 64

The composition of any one of Embodiments 1 or 61-62, wherein the $C_{1-12}$-alkyl phenyl ketone comprises a $C_{1-12}$-n-alkyl phenyl ketone, most preferably wherein the $C_{1-12}$-alkyl phenyl ketone comprises acetophenone.

Embodiment 65

The composition of any one of Embodiments 1 or 61-64, wherein the plasticizer further comprises an additional plasticizer, wherein the additional plasticizer is glycerol, furfural, furfuryl alcohol, cinnamaldehyde, anthracene oil, creosote oil, 2,2,4-trimethyl-1,3-pentanediol diisobutyrate, tung oil, cedarwood oil, castor oil, paraffin oil, $C_{1-12}$-alkoxy phenols, methyl anthranilate, benzaldehyde, benzyl alcohol, $C_{1-12}$-alkyl phenylacetaldehydes, $C_{1-12}$-alkyl benzaldehydes or a combination thereof, more preferably wherein the additional plasticizer comprises methyl anthranilate, benzaldehyde, benzyl alcohol, $C_{1-12}$-alkoxy phenols, or a combination thereof.

Embodiment 66

The composition of any one of Embodiments 1 or 61-65, comprising the hydrogen-bonded prepolymer and the plasticizer in amounts characterized by a ratio of moles of monomer equivalents of prepolymer to moles of plasticizer of 1:1 to 400:1.

Embodiment 67

The composition of any one of Embodiments 1 or 61-65, wherein the composition comprises the crosslinking agent, and the crosslinking agent has a solubility of less than or equal to 20 mg/mL in the plasticizer at 25° C., wherein the crosslinking agent is hexamethylenetetramine, paraformaldehyde, divinylbenzene, polyisocyanates (including diisocyanates), multifunctional amines (including diamines), ethylenically unsaturated compounds, for example, $C_{1-12}$-alkyl (meth)acrylates, styrene, or styrene derivatives, or a combination thereof, most preferably wherein the crosslinking agent comprises hexamethylenetetramine.

Embodiment 68

The composition of any one of Embodiments 1 or 61-67, comprising the hydrogen-bonded prepolymer and the crosslinking agent in amounts characterized by a ratio of moles of monomer equivalents of prepolymer to moles of crosslinking agent of 2:1 to 135:1.

Embodiment 69

The composition of any one of Embodiments 1 or 61-68, further comprising a filler, preferably 10 to 900 parts by weight filler per 100 parts by weight hydrogen-bonded prepolymer.

Embodiment 70

The composition of Embodiments 1 or 61-69, wherein the hydrogen-bonded prepolymer comprises a phenol-formaldehyde prepolymer having a molar ratio of phenol to formaldehyde greater than 1, wherein the plasticizer comprises methyl benzoate in amounts characterized by a ratio of moles of monomer equivalents of prepolymer to moles of plasticizer of 1:1 to 400:1, preferably 1:1 to 220:1; and wherein the composition comprises the crosslinking agent, and wherein the crosslinking agent comprises hexamethylenetetramine in amounts characterized by a ratio of moles of monomer equivalents of prepolymer to moles of crosslinking agent of 2:1 to 135:1.

Embodiment 71

A method of forming a cured resin, comprising: reacting the composition of any of Embodiments 1 or 61-70.

Embodiment 72

A cured resin obtained by the method of Embodiment 71.

Embodiment 73

An article comprising the cured resin of Embodiment 72.

Embodiment 74

A crosslinked composition, comprising: a hexamethylenetetramine-crosslinked phenol-formaldehyde resin; and a plasticizer comprising a $C_{1-12}$-alkyl benzoate, a $C_{1-12}$-alkyl phenyl ketone, a $C_{1-12}$-alkyl phenylacetaldehyde, a $C_{1-12}$-alkyl benzaldehyde, or a combination thereof, preferably methyl benzoate, acetophenone, or a combination thereof.

Embodiment 75

An article comprising the crosslinked composition of Embodiment 74.

All ranges disclosed herein are inclusive of the endpoints, and the endpoints are independently combinable with each other. Each range disclosed herein constitutes a disclosure of any point or sub-range lying within the disclosed range.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

The singular forms "a," "an," and "the" include plural referents unless the context clearly dictates otherwise. "Or" means "and/or" unless clearly indicated otherwise by context. A "combination" is inclusive of blends, mixtures, alloys, reaction products, and the like. "Optional" or "optionally" means that the subsequently described event or circumstance may or may not occur, and that the description includes instances where the event occurs and instances where it does not.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

Unless defined otherwise, technical and scientific terms used herein have the same meaning as is commonly understood by one of skill in the art to which this disclosure belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A curable composition, comprising:
   a hydrogen-bonded prepolymer, wherein the hydrogen-bonded prepolymer is a phenol-formaldehyde prepolymer, phenol-furfural prepolymer, aniline-formaldehyde prepolymer, urea-formaldehyde prepolymer, cresol-formaldehyde prepolymer, resorcinol-formaldehyde prepolymer, melamine-formaldehyde prepolymer, polyimide, polyurethane, epoxy resin, or a combination thereof;
   a plasticizer comprising a $C_{1-12}$-alkyl benzoate, a $C_{1-12}$-alkyl phenyl ketone, a $C_{1-12}$-alkyl phenylacetaldehyde, a $C_{1-12}$-alkyl benzaldehyde, or a combination thereof;
   an additional plasticizer, wherein the additional plasticizer is glycerol, furfural, furfuryl alcohol, cinnamaldehyde, anthracene oil, creosote oil, 2,2,4-trimethyl-1,3-pentanediol diisobutyrate, tung oil, cedarwood oil, castor oil, paraffin oil, a $C_{1-12}$-alkoxy phenol, methyl anthranilate, benzaldehyde, benzyl alcohol, a $C_{1-12}$-alkyl phenylacetaldehyde, or a combination thereof; and optionally, a crosslinking agent.

2. The composition of claim 1, wherein the hydrogen-bonded prepolymer comprises a phenol-formaldehyde prepolymer.

3. The composition of claim 2, wherein the phenol-formaldehyde prepolymer has a molar ratio of phenol to formaldehyde greater than 1.

4. The composition of claim 1, wherein the plasticizer comprises the $C_{1-12}$-alkyl benzoate.

5. The composition of claim 4, wherein the $C_{1-12}$-alkyl benzoate has the structure (1)

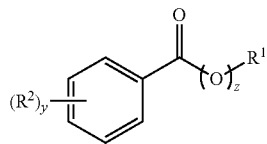

(1)

wherein $R^1$ and $R^2$ are independently at each occurrence $C_{1-12}$-alkyl, y is zero or 1, and z is 1.

6. The composition of claim 4, wherein the $C_{1-12}$-alkyl benzoate comprises a $C_{1-12}$-n-alkyl benzoate.

7. The composition of claim 4, wherein the $C_{1-12}$-alkyl benzoate comprises methyl benzoate.

8. The composition of claim 4, wherein the plasticizer comprises the $C_{1-12}$-alkyl phenyl ketone.

9. The composition of claim 8, wherein the $C_{1-12}$-alkyl phenyl ketone has the structure (2)

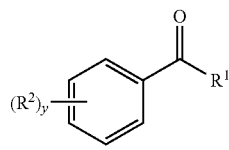

(2)

wherein $R^1$ and $R^2$ are independently at each occurrence $C_{1-12}$-alkyl, and y is zero or 1.

10. The composition of claim 8, wherein the $C_{1-12}$-alkyl phenyl ketone comprises a $C_{1-12}$-n-alkyl phenyl ketone.

11. The composition of claim 8, wherein the $C_{1-12}$-alkyl phenyl ketone comprises acetophenone.

12. The composition of claim 1, wherein the additional plasticizer is methyl anthranilate, benzaldehyde, benzyl alcohol, a $C_{1-12}$-alkoxy phenol, or a combination thereof.

13. The composition of claim 1, comprising the hydrogen-bonded prepolymer and the plasticizer in amounts characterized by a ratio of moles of monomer equivalents of prepolymer to moles of plasticizer of 1:1 to 400:1.

14. The composition of claim 1, wherein the composition comprises the crosslinking agent, and the crosslinking agent has a solubility of less than or equal to 20 milligrams/milliliter in the plasticizer at 25° C.

15. The composition of claim 1, wherein the composition comprises the crosslinking agent, and wherein the crosslinking agent is hexamethylenetetramine, paraformaldehyde, divinylbenzene, polyisocyanates, multifunctional amines, or a combination thereof.

16. The composition of claim 1, wherein the crosslinking agent is present and comprises hexamethylenetetramine.

17. The composition of claim 1, comprising the hydrogen-bonded prepolymer and the crosslinking agent in amounts characterized by a ratio of moles of monomer equivalents of prepolymer to moles of crosslinking agent of 2:1 to 135:1.

18. The composition of claim 1, further comprising a filler.

19. The composition of claim 18, comprising 10 to 900 parts by weight filler per 100 parts by weight hydrogen-bonded prepolymer.

20. The composition of claim 1,
wherein the hydrogen-bonded prepolymer comprises a phenol-formaldehyde prepolymer having a molar ratio of phenol to formaldehyde greater than 1; and
wherein the plasticizer comprises methyl benzoate.

21. The composition of claim 20, comprising the hydrogen-bonded prepolymer and the plasticizer in amounts characterized by a ratio of moles of monomer equivalents of prepolymer to moles of plasticizer of 1:1 to 400:1.

22. The composition of claim 20, wherein the composition comprises the crosslinking agent, and wherein the crosslinking agent comprises hexamethylenetetramine, and the hydrogen-bonded prepolymer and the hexamethylenetetramine in amounts characterized by a ratio of moles of monomer equivalents of prepolymer to moles of crosslinking agent of 2:1 to 135:1.

* * * * *